April 5, 1960     B. M. G. FÉRAND     2,931,663
SUSPENSION BY TWO PIVOTING EXTENSIBLE CONJUGATED
LINKAGES FOR VEHICLE WHEELS
Filed March 18, 1957
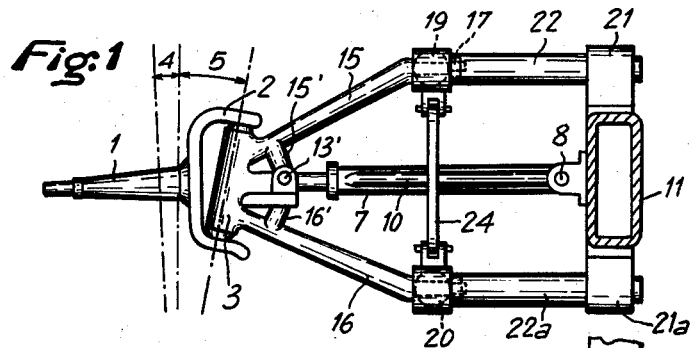
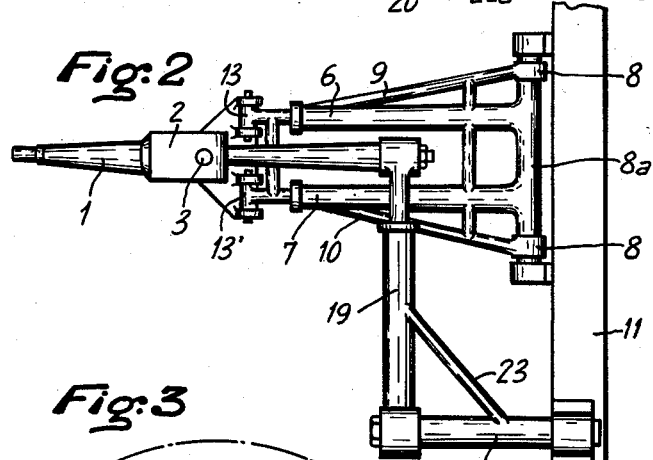
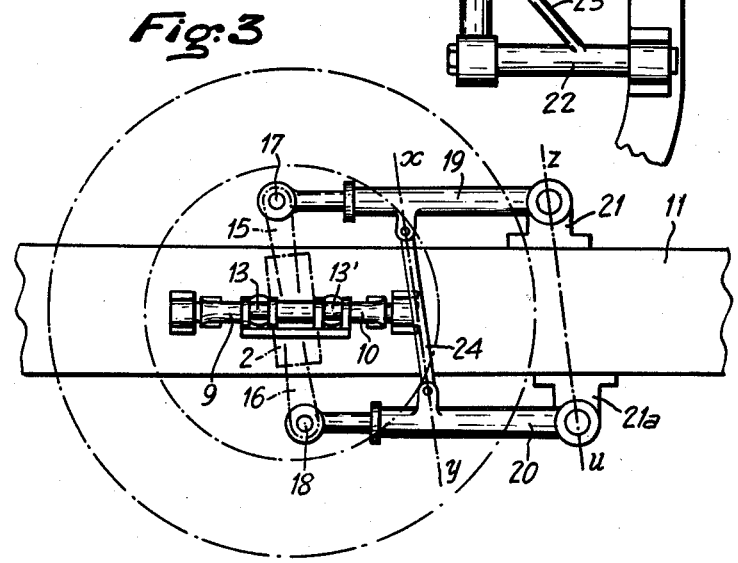
INVENTOR
BERNARD MARCEL GERMAIN FERAND
BY Irwin B. Thompson
ATTORNEY

2,931,663

SUSPENSION BY TWO PIVOTING EXTENSIBLE CONJUGATED LINKAGES FOR VEHICLE WHEELS

Bernard Marcel Germain Férand, Saint-Germain-sur-Sarthe, France

Application March 18, 1957, Serial No. 646,819

Claims priority, application France March 20, 1956

8 Claims. (Cl. 280—96.2)

It is well known that automobile-builders now utilize suspension systems characterized by articulated quadrilaterals and by pivoting levers. But, as suspensions of the last kind don't permit the maintenance of the direction plane without considerable difficulty, it appears that the builders are induced to utilize principally the first-mentioned system, nevertheless carrying out a compromise between the necessity of maintaining an approximate constancy of the track and the obligation of keeping the camber angle.

The utilization of telescopic forks and of vertically sliding tubes has permitted the realization of a sure suspension, but the displacement of the sliding members is necessary and it causes a rather rapid wearing.

Of course several devices have been or are utilized to ensure the guiding movement of the hinged member in those systems, but they are more or less complicated and more or less efficient.

My invention has for its object to provide a pivoting lever suspension that is very simply executed, and which allows and ensures a rectilinear displacement of the member to which it is adapted.

This suspension device is substantially constituted by two joined pivoting extensible linkages placed in two intersecting planes and joining the member that is subject to the shocks to be absorbed to a fixed point positioned in each of said planes, and arranged so as to ensure the translation of this member along the intersection of the said two planes.

This arrangement ensures the displacement of a member subject to oscillations along a straight line in any predetermined direction, as it is urged to a movement in one of the said planes and together in the other plane and consequently along the straight lines forming the intersection of the two planes.

Another feature of the invention is to provide an embodiment of the said suspension device adapted to motor car wheels, wherein the wheel journal is joined, on the one hand, to a fixed point of the chassis, the side frame for example, by a lateral pivoting extensible linkage, essentially constituted by at least an isosceles triangle having at least one slide. The wheel journal, on the other hand, is joined to a second fixed point of the chassis, constituted by a bracket integral with the side-frame or the gear box of the hindcarriage, by a longitudinal pivoting extensible linkage, constituted by two superposed parallel slides joined with each other by a connecting rod, and eventually by right-angled triangles, the said rod and the bracket being sloped according to the keeping of the constant value of the inclination, caster and camber angles.

An embodiment of the invention is illustrated by the accompanying drawings, wherein:

Fig. 1 is a schematic view of the mounting of the longitudinal linkage on the journal of a front wheel.

Fig. 2 is a schematic view of the mounting of the lateral linkage and of the fixed bracket of the longitudinal linkage.

Fig. 3 is an elevational view of the longitudinal linkage.

Fig. 4 is a broken-away section of a slide member showing a spring-biasing system.

Specific reference to the drawings indicate that between the branches of a fork 2 made integral with the journal 1 of a front motor car wheel is mounted with ball bearings a bracket 3 sloped to agree with the camber angle 4 and the inclination angle 5.

On the bracket 3 are mounted the two slides 6 and 7 forming an indeformable rectangle with it and with the rod 8, which is the joint axle for the trapezium formed by the rod 8 and the struts 9 and 10 and mounted on the side-frame 11.

The slides 6 and 7 linked in pairs of ears 13 and 13' constitute the lateral linkage. The bracket 3 comprises two arms 15 and 16, braced by members 15' and 16' respectively, provided at their ends with two journals 17 and 18 that have mounted thereupon the two telescopic slides 19 and 20, the outer tubes of which are connected with the side-frame 11 by the tubular members 22 and 22a and the struts 23, the tubular members 22 and 22a being journalled in brackets 21 and 21a. Said lower slide 20 and upper slide 19 constitute the longitudinal linkage.

The axis $xy$, $zu$ and the connecting rod 24 are parallel with each other and sloped to the vertical with an angle equal to the caster angle.

In Fig. 4 there is shown a spring-biasing system to provide tension for the slide members 6, 7, 19 and 20. The piston 30 has at one end a flange 32 integral therewith inside cylinder 31. Between one end of the cylinder 31 and the flange 32 a spring 33 is provided to maintain spring tension at all times.

Of course, the embodiment described and illustrated, which is specially suitable to a front wheel of a driving rear axle car, is not limitative of the invention, and, without departing from its principle, various minor changes may be carried out in the shapes of the mounting of the linkages, and for its application to the rear wheels and also to a front driving wheel.

It is so, more particularly, with a rear wheel, the journal bracket of which is, of course, conformed in an appropriate manner, a disc in the shape of a truncated cone for example, that the longitudinal linkage may be realized by two oblique right-angled trapeziums, bearing two joined slides forming a movable indeformable rectangle, and the lateral linkages by two isosceles triangles. The lateral linkages ensure the pushing of the car and the gear case is hanged in order to absorb the reaction.

With a front driving wheel, the journal bracket may be circular with extending at 180° struts and the coupling journal will be driven by the means of grooves and catches.

In the case of heavy cars, it is advantageous, besides, to substitute for the single lateral central trapezium two superposed right-angled triangles.

The application of the suspension system according to the invention to the motor car wheels presents the important advantage to allow the wheels to be raised up along a straight line, what ensures the constancy of the track and of the wheel base as well as that of the inclination, camber and caster angles, in maintaining the direction plane and avoiding that any risk of any gyroscopic effect may be prejudicial for the pneumatic tyres and for the direction.

The system exerts, moreover, neither a pressure nor a pulling upon the joints, what suppresses any risk of a premature wearing; besides, the movement of the slides which work, in preference, only about the tangent point, is very reduced.

Lastly the translation shifting of the wheel is a factor of stability for the chassis, because it is opposed to a rolling action. It will be understood, besides, that any known pneumatic or other mechanism may be adapted to the proposed suspension system; for example, springs biasing main support members of the suspension system.

What I claim is:

1. In a wheel suspension for a vehicle having a frame member, a journal for a wheel, an inclined bracket, a fork pivoted to said bracket and carrying said journal, lateral linkage connected to said bracket and pivoted to said frame member and longitudinal linkage connected to said bracket and pivoted to said frame member, said lateral linkage comprising a spring-biased slide pivotally connected with said bracket and pivotally secured to said frame member on a pivot extending longitudinally of the vehicle, said longitudinal linkage comprising an arm rigidly secured to said bracket in a plane perpendicular to the vehicle longitudinal axis, a slide journalled on said arm and extending longitudinally of the vehicle, and means securing said slide to said frame member for pivotal movement in a vertical plane.

2. The wheel suspension of claim 1, in which said slide of said lateral linkage is pivoted to said bracket about an axis extending longitudinally of the vehicle.

3. In a wheel suspension for a vehicle having a frame member, a journal for a wheel, an inclined bracket, a fork pivoted to said bracket and carrying said journal, lateral linkage connected to said bracket and pivoted to said frame member and longitudinal linkage connected to said bracket and pivoted to said frame member, said lateral linkage comprising a pair of parallel spring-biased slides pivoted to said bracket and pivotally secured to said frame member on a pivot extending longitudinally of the vehicle, said longitudinal linkage comprising an arm rigidly secured to said bracket in a plane perpendicular to the vehicle longitudinal axis, a slide journalled on said arm and extending longitudinally of the vehicle, and means securing said slide to said frame member for pivotal movement in a vertical plane.

4. The wheel suspension of claim 3, in which said slides of said lateral linkage are pivoted to said bracket about an axis extending longitudinally of the vehicle.

5. In a wheel suspension for a vehicle having a frame member, a journal for a wheel, an inclined bracket, a fork pivoted to said bracket and carrying said journal, lateral linkage connected to said bracket and pivoted to said frame member and longitudinal linkage connected to said bracket and pivoted to said frame member, said lateral linkage comprising a spring-biased slide pivotally connected with said bracket and pivotally secured to said frame member on a pivot extending longitudinally of the vehicle, said longitudinal linkage comprising a pair of arms rigidly secured to said bracket and lying in a plane perpendicular to the vehicle longitudinal axis, a slide journalled on each of said arms and extending longitudinally of the vehicle, and means securing said slides to said frame for pivotal movement in a vertical plane.

6. In a wheel suspension for a vehicle having a frame member, a journal for a wheel, an inclined bracket, a fork pivoted to said bracket and carrying said journal, lateral linkage connected to said bracket and pivoted to said frame member and longitudinal linkage connected to said bracket and pivoted to said frame member, said lateral linkage comprising a spring-biased slide pivotally connected with said bracket and pivotally secured to said frame member on a pivot extending longitudinally of the vehicle, said longitudinal linkage comprising a pair of arms rigidly secured to said bracket and lying in a plane perpendicular to the vehicle longitudinal axis, a slide journalled on each of said arms and extending parallel to said axis, means securing said slides to said frame for pivotal movement in a vertical plane, and a connecting rod extending between said last-mentioned slides.

7. The wheel suspension of claim 6, said bracket, said connecting rod and said means lying in parallel planes.

8. In a wheel suspension for a vehicle having a frame member, a journal for a wheel, an inclined bracket, a fork pivoted to said bracket and carrying said journal, lateral linkage connected to said bracket and pivoted to said frame member and longitudinal linkage connected to said bracket and pivoted to said frame member, said lateral linkage comprising a pair of parallel spring-biased slides pivoted to said bracket and pivotally secured to said frame member on a pivot extending longitudinally of the vehicle, said longitudinal linkage comprising a pair of arms rigidly secured to said bracket and lying in a plane perpendicular to the vehicle longitudinal axis, a slide journalled on each of said arms and extending longitudinally of the vehicle, and means securing said slides to said frame for pivotal movement in a vertical plane.

References Cited in the file of this patent

UNITED STATES PATENTS

| | | |
|---|---|---|
| 2,131,661 | Heyermans et al. | Sept. 27, 1938 |
| 2,345,201 | Krotz | Mar. 28, 1944 |
| 2,562,706 | Engle | July 31, 1951 |

FOREIGN PATENTS

| | | |
|---|---|---|
| 652,485 | France | Oct. 23, 1928 |
| 346,415 | Italy | Feb. 12, 1937 |